US005436816A

United States Patent [19]

Nagano

[11] Patent Number: 5,436,816

[45] Date of Patent: Jul. 25, 1995

[54] COVE LIGHTING APPARATUS

[75] Inventor: Thomas T. Nagano, Cerritos, Calif.

[73] Assignee: Tivoli Industries, Inc., Santa Ana, Calif.

[21] Appl. No.: 308,664

[22] Filed: Sep. 19, 1994

[51] Int. Cl.$^6$ ..................... F21S 3/00; F16B 1/00

[52] U.S. Cl. ..................... 362/219; 362/221; 362/225; 362/249; 362/260; 362/147; 248/71

[58] Field of Search ............... 362/219, 221, 225, 249, 362/396, 391, 147, 404, 260, 216, 250, 457, 377; 248/71, 316.7

[56] References Cited

U.S. PATENT DOCUMENTS 3,154,281 10/1964 Frank .................. 248/71
5,221,139 6/1993 Belfer .................. 362/219

FOREIGN PATENT DOCUMENTS 21441 of 1899 United Kingdom ................ 362/225

OTHER PUBLICATIONS

New 4–Pin Long Twin Tube Lampholder, Leviton T–8 Fluorescent, Apr. 1991.
Norbert Belfer Lighting Catalog, p. 15, 1990.

*Primary Examiner*—Ira S. Lazarus
*Assistant Examiner*—Sara Sachie Raab
*Attorney, Agent, or Firm*—Price, Gess & Ubell

[57] ABSTRACT

First and second light fixtures, each mounting a fluorescent lamp, are interconnected by a flexible conduit which conducts electrical interconnections between the lamps and a ballast located in one of the fixtures. The flexible conduit permits orienting the respective fixtures to accommodate positioning along a variety of curved paths at the installation site. A three-part lamp support structure featuring a pair of resiliently-biased receptacle arms for receiving a twin tube fluorescent lamp is also disclosed.

13 Claims, 2 Drawing Sheets

COVE LIGHTING APPARATUS

BACKGROUND OF THE INVENTION

1. Field of the Invention

The present invention relates to lighting apparatus and, more specifically, to an arced assemblage of fluorescent lighting fixtures particularly suitable for cove lighting applications.

2. Description of Related Art

Fluorescent cove lighting systems have been used for some time for decorating and illuminating applications in both private homes and commercial establishments. Such lights oftentimes provide an architecturally and aesthetically desirable mood lighting effect near the juncture of walls and ceilings.

Such fluorescent cove lighting has been typically provided by a single linear fixture of length suited to the application. It has appeared desirable to use cove lighting in other than straight line applications. For such purposes, the prior art has employed fixtures with custom fabricated mitred ends such that the fixtures meet at an angle at their abutting mitred ends. Alternatively, single curved fixtures have been custom fabricated to track various curves with multiple tubes arranged on the single curved fixture. As may be appreciated, the need for custom fabrication entails considerable cost and expense and risks errors in communication which can result in fixtures not ideally fitting their ultimate installation site.

OBJECTS AND SUMMARY OF THE INVENTION

Accordingly, it is an object of the invention to provide improved lighting apparatus;

It is another object to improve fluorescent cove lighting apparatus;

It is yet another object to provide cove lighting apparatus readily adaptable to various nonlinear applications and layouts; and It is a further object of the invention to minimize or eliminate the need for custom fabrication of nonlinear light fixture layouts.

The present invention comprises a group of lighting fixtures, a number of which are interconnected by flexible conductor-carrying interconnections. Each fixture may carry one fluorescent tube. By means of the flexible interconnections, the fixtures may be joined together physically and electrically and, at the same time, angled in position with respect to one another in order to accommodate various nonlinear contours. The joinder and angling of the fixtures may be performed at the installation site so as to accommodate the curved contours actually present, which is a considerable advantage over attempting to factory-produce fixtures to accommodate specified contours.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an inexpensively manufacturable and easily usable lighting apparatus.

Figures 1, 2, 4:
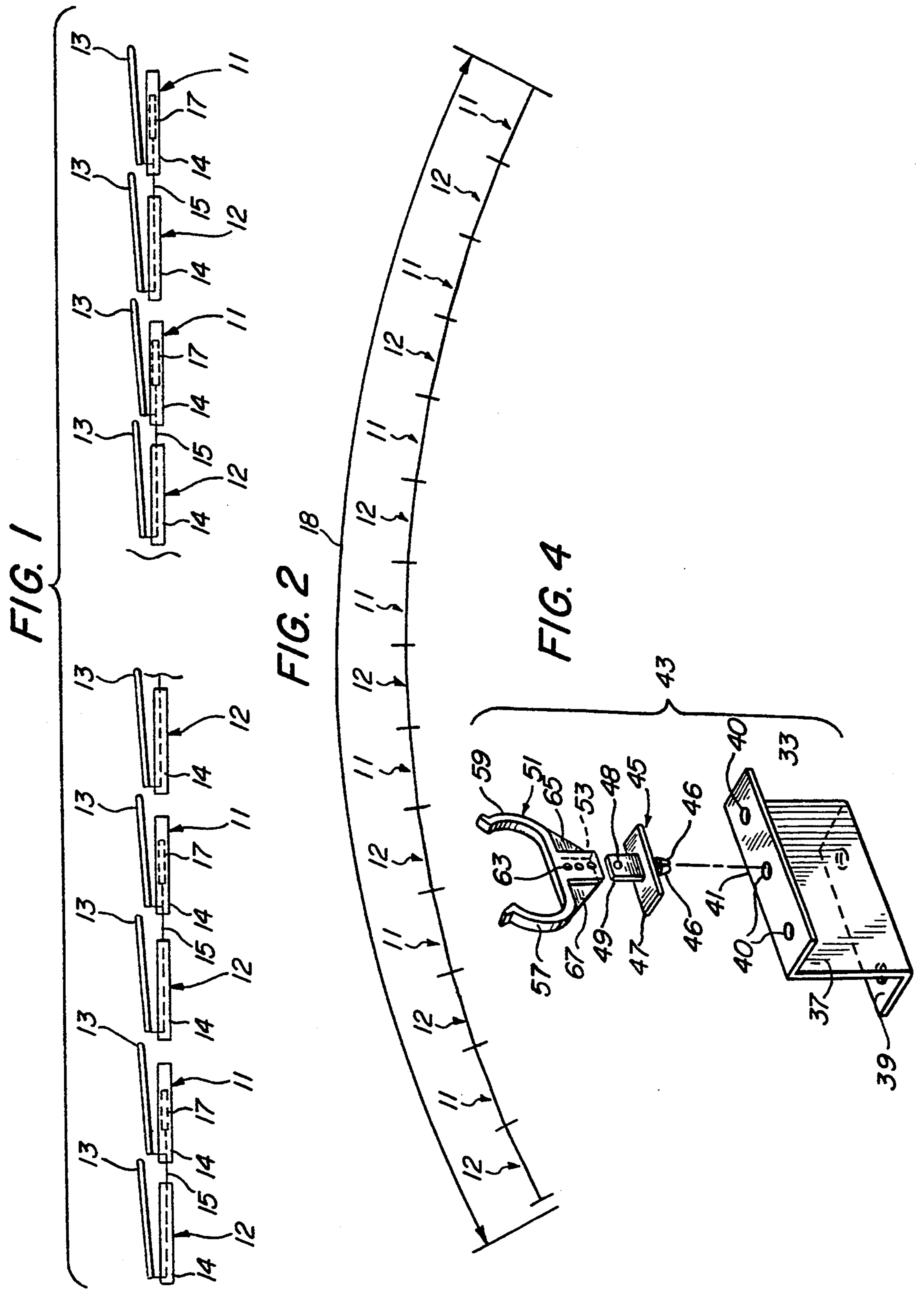
FIG. 1 is an elevational schematic view of lighting apparatus according to the preferred embodiment.
FIG. 2 is a schematic top view illustrating a layout of lighting apparatus according to FIG. 1.
FIG. 4 illustrates an exploded view of an angle bracket and lamp support according to the preferred embodiment.

The preferred embodiment of the invention is illustrated in FIG. 1 and includes a series of individual light fixture pairs 11, 12. The members 11, 12 of each pair are interconnected with one another by flexible conductor-carrying interconnection members 15.

While any number of fixture pairs 11, 12 may be configured according to the invention, the illustrative example under discussion in FIG. 1 employs seven fixture pairs 11, 12. These pairs 11, 12 are arrayed along a 24-foot arc of a circle having a radius of 25 feet, in other words, a relatively wide and long arc. FIG. 2 illustrates the arc 18 in which the individual light fixtures 12, 11 of FIG. 1 are laid out according to the illustrative embodiment.

As further shown in FIG. 1, each individual fixture 11, 12 includes a base unit 14 and a lamp unit 13 attached thereto. As further shown in FIG. 1, one fixture 11 of each interconnected pair 11, 12 contains an electronic ballast 17. Such ballasts 17 are well known in the art, per se. Electrical conductors extend from the ballast 17 through the interconnection member 15 such that the ballast 17 serves to activate both lamp units 13 of each fixture pair 11, 12.

Figure 3:
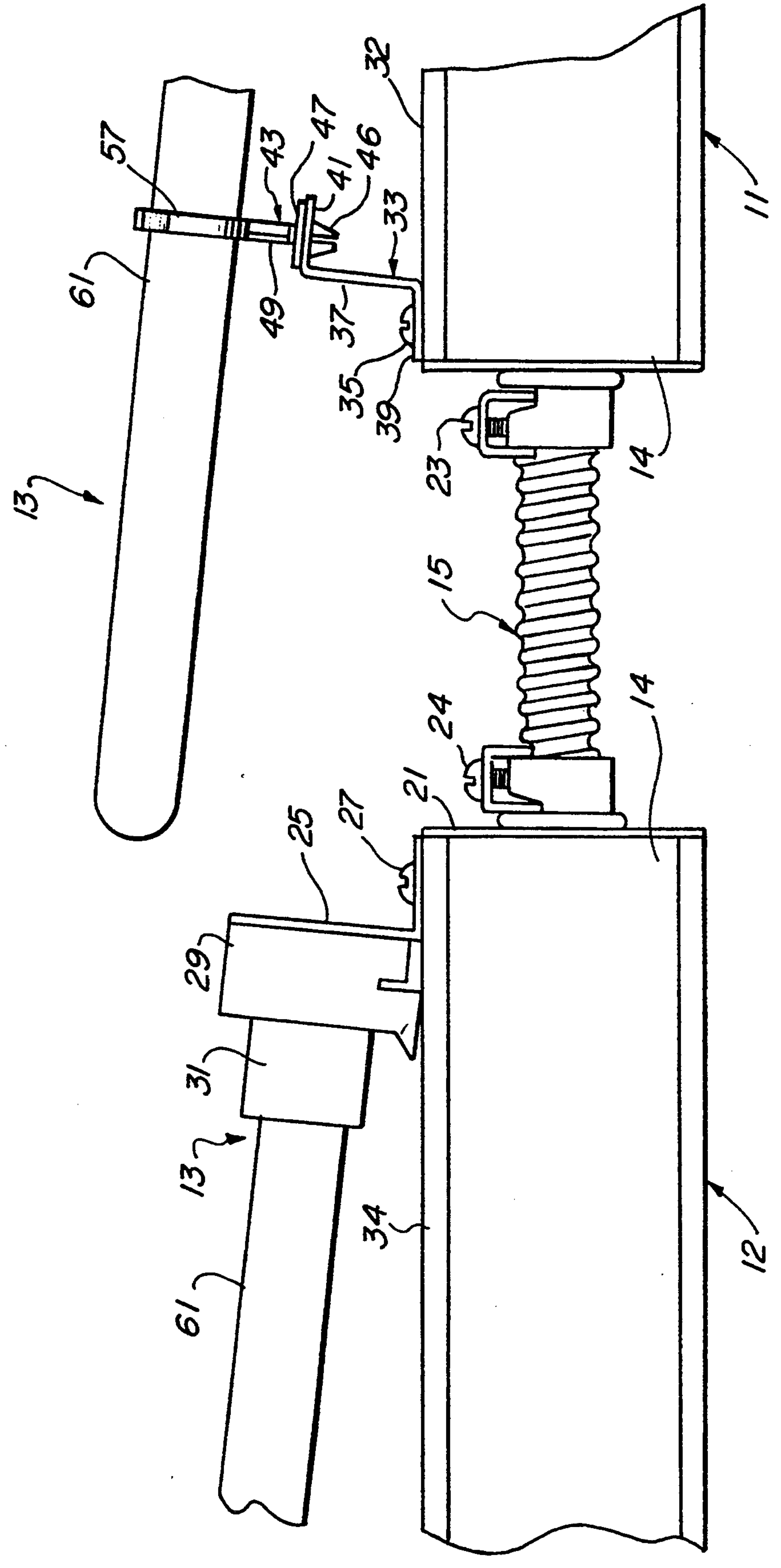
FIG. 3 is a fragmented side elevational mechanical view of apparatus according to the preferred embodiment.

FIG. 3 illustrates a particularly advantageous embodiment according to the invention. In this embodiment, the base units 14 of the respective fixtures 11, 12 comprise aluminum tubes of rectangular cross-section. The flexible, conductor-carrying interconnection member 15 comprises a segment of flexible electrical conduit, for example, four inches in length. The interconnection member 15 extends a short distance into the interior of each of the respective fixtures 11, 12, and is rigidly held in position with respect to each respective fixture 11, 12 by respective screw clamps 23, 24. The conduit 15 may be bent or arced so as to angle one fixture 11 with respect to the other fixture 12. In this manner, the array of fixture pairs 11, 12 can traverse an arc or other desired curve, such as the arc 18 shown in FIG. 2.

As further shown in FIG. 3, the top surface 34 of the base unit 14 of the fixture 12 has an "L" bracket 25 fastened thereto by a conventional fastening means 27, such as a screw or bolt. A female plug unit 29 is mounted to the side of the "L" bracket 25. The female plug unit 29 receives the cooperating male plug 31 of a biax or twin tube fluorescent lamp 61. The "L" bracket 25, the female plug 29, the male plug 31, and the fluorescent lamp 61 make up a lamp unit 13 according to the illustrative embodiment.

Turning to the first fixture 11 of the fixture pair 11, 12 shown in FIG. 3, a bracket 33 is attached to the top surface 32 of its base unit 14 by a fastening means 35. The bracket 33 includes a first generally flat flange portion 39 which mounts flush to the planar top surface 32 of the base unit 14. The bracket 33 further includes a plate 37 extending from the flange 39 at a slightly obtuse angle thereto. The plate 37 is flat and rectangular in shape, and has a second generally flat rectangular flange 41 mounted at a slightly acute angle thereto and thereby positioned above the top surface 32 of the base unit 14.

Referring now to FIGS. 3 and 4, a snap-fit lamp support member 43 is fitted into a hole 40 in the upper flange 41. Several holes 43 may be provided if desired for variously positioning a lamp unit 13.

The snap-fit lamp support 43 includes an interlocking base plug unit 45 and a lamp holder member 51, both of which are preferably injection molded plastic parts. The base plug unit 45 includes a square or rectangular planar base support surface 47 lying in a horizontal plane and having a pair of split mounting fingers 46. The mounting fingers 46 depend from the bottom side of the base support surface 47, while a vertical, generally rectangular support arm 49 extends from and meets perpendicularly with the top side of the base support surface 47. A mounting dimple 48 is formed on each of the flat rectangular side surfaces of the support arm 49.

The lamp holder 51 is designed to slidingly mount onto the rectangular support arm 49 and interlock with the dimples 48. In order to achieve this interlocking function, a linear array of holes 63 are drilled or otherwise formed into the front and back sides of a hollow rectangular receiving channel 53. Generally triangular support webs 65, 67 are formed between each vertical edge of the receiving channel 53 and a respective horizontal underside portion of respective receptacle arms 57, 59.

In order to receive and mount the twin tube fluorescent lamp 61, the pair of receptacle arms 57, 59 are formed on either side of the receiving channel 53 and are cupped in shape as shown, so as to resemble a pair of steer horns. These receptacle arms 57, 59 are resilient so as to be movable away from one another in the plane encompassing them and dimensioned to create a slight interference fit which gently grips the twin tube fluorescent lamp 61.

Those skilled in the art will appreciate that various adaptations and modifications of the just-described preferred embodiment can be configured without departing from the scope and spirit of the invention. For example, the bracket 25 can be provided at its upper edge with a flange similar to flange 41 such that a lamp support 43 can be mounted to the bracket 25. In this manner, the fluorescent tube 13 could extend over or adjacent female plug unit 29. Other similar variations will be apparent to those skilled in the art. Therefore, it is to be understood that, within the scope of the appended claims, the invention may be practiced other than as specifically described herein.

What is claimed is:

1. Lighting apparatus comprising:

a first light fixture means for mounting a first fluorescent lamp and having an opening in a first end thereof;

a second light fixture means for mounting a second fluorescent lamp and having an opening formed in an end thereof positioned opposite said first end;

means for providing a flexible passageway connecting the opening in said first end to the opening in said second fixture opposite said opening in said first end;

a ballast in one of said first and second fixture means; and conductor means passing through said means for providing a flexible passageway and connected to said ballast and to said first and second fluorescent lamps.

2. The apparatus of claim 1 further including:

bracket means mounted on a top surface of one of said first and second fixtures; and a lamp support means for snapfitting into said bracket means for resiliently engaging and retaining one of said first and second fluorescent lamps.

3. The apparatus of claim 2 wherein said lamp support means comprises:

a base plug having a rectangular surface;

a split plug depending from said surface;

a rectangular support arm extending upward from said surface; and a lamp holder slidably mountable on said support arm and having first and second receptacle arms thereon curved to create a cup-shaped lamp receptacle.

4. The apparatus of claim 3 wherein said support arm has at least one dimple thereon and wherein said lamp holder includes means for interlocking with said at least one dimple.

5. The apparatus of claim 4 wherein said receptacle arms are resiliently biased in position with respect to one another.

6. The apparatus of claim 1 wherein said means for providing a flexible passageway comprises a segment of flexible electrical conduit.

7. A lamp support comprising:

a base plug having a base surface;

a split plug depending from said base surface;

a support arm extending upward from said base surface; and a lamp holder slidably mountable on said support arm and having first and second receptacle arms thereon curved to create a cup-shaped lamp receptacle.

8. The apparatus of claim 7 wherein said support arm has at least one dimple thereon and wherein said lamp holder includes means for interlocking with said at least one dimple.

9. The apparatus of claim 8 wherein said first and second receptacle arms are resiliently biased in position with respect to one another.

10. The apparatus of claim 8 wherein said base surface is a rectangular surface in a horizontal plane and said support arm is a rectangular surface in a plane perpendicular to said horizontal plane.

11. The apparatus of claim 10 wherein said lamp holder includes a hollow rectangular receiving channel for mounting on said support arm.

12. The apparatus of claim 11 wherein said receiving channel has first and second vertical side edges and further including first and second web portions interconnecting respective portions of said first and second receptacle arms.

13. The apparatus of claim 12 wherein said first and second receptacle arms are resiliently biased in position with respect to one another.

* * * * *